United States Patent [19]
Oglesbee et al.

[11] Patent Number: 5,694,025
[45] Date of Patent: Dec. 2, 1997

[54] BATTERY CHARGER WITH CONTROL CIRCUIT

[75] Inventors: John W. Oglesbee, Watkinsville; Michael D. Geren, Duluth, both of Ga.

[73] Assignee: Motorola, Inc., Schaumburg, Ill.

[21] Appl. No.: 636,486

[22] Filed: Apr. 23, 1996

[51] Int. Cl.⁶ ............................................. H01M 10/46
[52] U.S. Cl. ................................................. 320/49
[58] Field of Search ............................. 320/5, 12, 49, 320/50, 51, 53, 54; 363/21, 84, 89

[56] References Cited

U.S. PATENT DOCUMENTS

| | | | |
|---|---|---|---|
| 4,308,577 | 12/1981 | Mentler | 363/134 |
| 4,560,918 | 12/1985 | Callen | 323/273 |
| 4,888,545 | 12/1989 | Celenza et al. | 363/89 X |
| 5,124,906 | 6/1992 | Kang | 363/21 |
| 5,479,087 | 12/1995 | Wright | 363/21 X |

*Primary Examiner*—Edward Tso
*Attorney, Agent, or Firm*—Scott M. Garrett; Kenneth M. Massaroni

[57] ABSTRACT

A battery charger (10) is provided with a power supply (26) which is energized by a main winding (22) and a bias winding (24) on the secondary side (18) of an input transformer (14). The charger switches a main voltage level provided at a main voltage output (28) according to a pulse width modulation scheme, and has an output section (36) for filtering the switched voltage. A power switch (38) is coupled between the output section and the main voltage output, and is driven by a bias switch (48) coupled between the control terminal (50) of the power switch, and a bias voltage output (30), which provides a bias voltage level that is higher then the main voltage level by a minimum delta.

13 Claims, 2 Drawing Sheets

BATTERY CHARGER WITH CONTROL CIRCUIT

TECHNICAL FIELD

This invention relates in general to battery chargers, and more particularly, to battery chargers utilizing switched mode power supplies.

BACKGROUND

Battery chargers are used in portable electronic systems to charge and sometimes condition the secondary batteries used by these systems. Recently, emphasis in designing chargers for such systems has been on reducing their size and cost. Reducing the size of battery chargers is particularly challenging since battery volumetric capacity, that is, the energy storage per unit volume, has been increasing. As a result, in order to recharge a battery in a rapid fashion, typically in one hour, the power delivered to the battery must increase. Thus the power output of the charger must increase. This has meant a shift in charger power supply design to switched mode power conversion and regulation. Switched mode power regulation is much more efficient than linear type regulation in most cases, and therefore eliminates much of the heat sinking required for linear regulation, thus allowing a reduction in volume.

In implementing a switched mode regulator, it is common to use a forward mode topology. This topology often employs a high side switch between an output section, comprising a series inductor and a shunt freewheel diode, and a voltage source. In battery chargers a number of circuits are referenced to a single common voltage, usually the most negative such as a return line. Such circuits include, for example, thermistors for temperature sensing. To allow continuous sensing of these ancillary circuits, a high side switch is preferred. A low side switch would necessitate interrupting the connection to the common node, and thus complicate sensing with these circuits. Since the output of the voltage source is typically the highest level of voltage available, and since the switch device is on the high side, either a PNP bipolar transistor or a P-channel MOSFET (metallic oxide semiconductor field effect transistor) is used. By connecting the control terminal of the switch to a lower voltage the transistor switch closes, and current flows through the transistor from the voltage source to the output section. The control terminal is the base for a bipolar device and the gate for a MOSFET.

To reduce the overhead power use of the charger, it is preferable to use a MOSFET over a bipolar transistor because of the large amount of current needed to drive a bipolar transistor. However, P-channel MOSFETs require more silicon than their N-channel counter parts, and thus are inherently more expensive. It is possible to use an N-channel device on the high side, but this has always required a charge pump or similar circuit to generate a voltage higher than the main voltage supply to drive the MOSFET. However, the use of a charge pump in a battery charger is avoided because of the added cost and space.

Therefore there exists a need in a battery charger for a means for generating a voltage high enough to drive an N-channel MOSFET high side switch, without adding a significant amount of circuitry, and in a cost effective manner.

DETAILED DESCRIPTION OF THE PREFERRED EMBODIMENT

Figure 1:
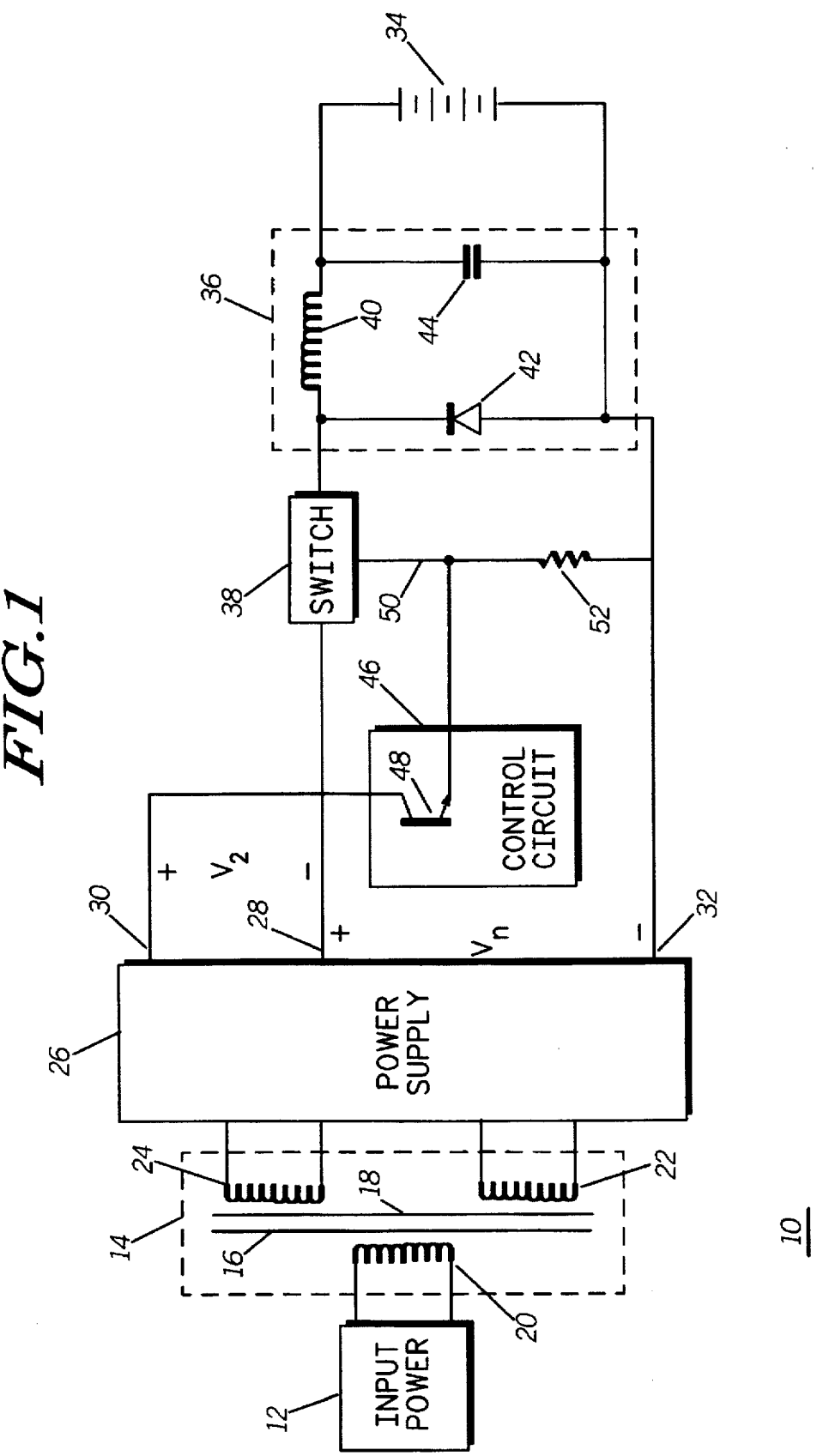
FIG. 1 is a block diagram of a battery charger in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a block diagram of a battery charger 10 in accordance with the invention. The charger has an input power supply 12 and a transformer 14 having a primary side 16 and a secondary side 18. The primary side comprises a primary winding 20. The input power supply may be either AC line voltage (120-240 VAC, 50-60 Hz), or it may be a switched mode power supply, such as, for example, a flyback power converter. The input power supply drives a main winding 22, which is commonly referred to as a secondary winding, and a bias winding 24 on the secondary side of the transformer for the power supply 26 that feeds the charger circuitry. The power supply provides a main voltage level Vm at a main voltage output 28, and a bias voltage level at a bias voltage output 30. The bias voltage level is higher than the main voltage level, as measured from a return line 32, by a predetermined delta Vd.

The charger is connected to a battery 34 through the output section 36. The output section filters a switched voltage provided by the power switch 38, which is connected between the output section and the main voltage output. The output section is a standard forward mode converter output section, and comprises a series inductor 40 connected between the power switch and the battery, a freewheel diode 42 coupled between the power switch 38 and the return line 32 of the power supply, and optionally an output filter capacitor 44 coupled in parallel with the battery. Voltage from the main voltage output 28 is switched to the output section according to a pulse width modulation scheme controlled by the control circuit 46.

The control circuit 46 comprises a bias switch 48, which is used to switchably connect the bias voltage output 30 with the control terminal 50 of the power switch 38. The bias switch can be driven by any standard means known in the art to achieve the desired pulse width modulation. However, the bias switch can only act to supply bias voltage to the control terminal of the power switch. To unbias the power switch, and thus turn it off, a control network 52, such as a pull down resistance is needed. The pull down resistance is connected to the control terminal 50, and is preferably coupled between the control terminal and the return line 32. The resistance value of the pull down resistance would be selected such that it discharges the control terminal very shortly after the bias switch is turned off, but not drain a significant current when the bias switch is on.

Here the control terminal is connected in a normally low state. That is, when the bias switch is not conducting, the control terminal is at a low voltage. It is contemplated that the bias switch and the control network, i.e. the pull down resistance, could be effectively juxtaposed. The bias switch would then be used to connect the control terminal to a low voltage while the control network feeds a high voltage. In such a case the normal pulse width modulation signal fed to the bias switch would have to be inverted, and care should be taken to see that the power switch 38 remains open when the charger is idle.

Figure 2:
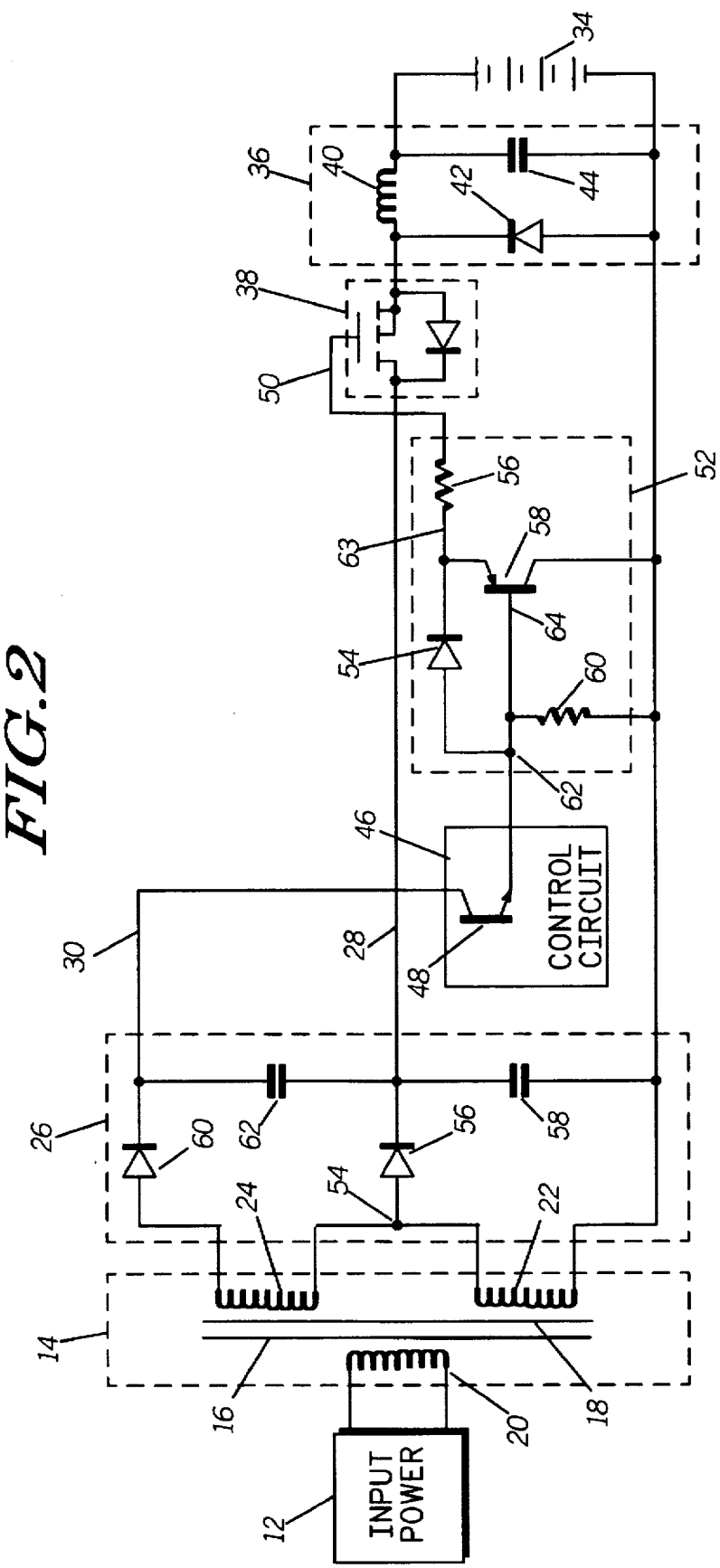
FIG. 2 is a detailed circuit diagram of a battery charger in accordance with a preferred embodiment of the invention.

Referring now to FIG. 2, there is illustrated therein a detailed circuit diagram of a battery charger 10 in accordance with a preferred embodiment of the invention. Here the power supply 26 arranges the bias winding 24 and the main winding 22 in series, and they could in fact be one winding tapped at a bias point 54. To provide the main voltage level at the main voltage output 28, a main rectifier 56 is coupled between the main winding 22 and the main voltage output, and a main output capacitor 58 is coupled between the main voltage output 28 and the return line 32.

To provide a bias voltage level which is higher than the main voltage level, a bias rectifier 60 is coupled between the bias winding 24 and the bias voltage output 30 is used similarly to the main supply. To filter the output of the bias rectifier, a bias output capacitor 62 is used which is coupled between the bias voltage output 30 and the main voltage output 28. Other winding, rectifier, and filter capacitor arrangements may be equivalently used, but it is necessary that the bias voltage level always be higher than the main voltage level. In the case where the power switch is, as is preferable, an N-channel MOSFET, the bias voltage level should be higher than the main voltage level by at least the gate-source threshold voltage of the MOSFET.

The power switch 38, as mentioned previously, is preferably an N-channel MOSFET, although any electrical or electronic switch requiring a voltage higher than that which it switches may be used. The control terminal 50 is the gate of the MOSFET, and is connected through the control network 52 to an output of the control circuit to a bias switch 48. The control circuit operates the bias switch 48 to connect the control terminal to the bias voltage output 30 according to a pulse width modulation scheme to provide a switched voltage to the output section 36. Since the gate terminal is capacitively coupled to the MOSFET channel by the metallic oxide layer, some means to bleed off the charge stored by the gate-source capacitance of the MOSFET is needed. To achieve the necessary gate discharge path, the control network 52 is used, and is preferably coupled between the gate of the MOSFET and the return line, although it is contemplated that it may be coupled between the gate of the MOSFET and the main voltage output as well.

In the preferred embodiment the control network comprises active elements for efficiency and speed. Specifically, the bias switch 48 feeds the control terminal of the power switch through a diode 54 and a current limiting resistor 56. When the bias switch is off, and the gate-source capacitance of the power switch is charged, the charge is removed by an emitter follower comprised of a PNP bipolar transistor 58, and a base resistor 60. When the bias switch 48 is opened, the bias voltage level is substantially present at a control node 63. The base resistor is connected between a feed node 62 and the return line 32, and controls the operation of the PNP bipolar transistor, connected between the control node 63 and the return line 32, and having a base 64 also coupled to the feed node 62. This arrangement allows the base resistor to have a much higher resistance than would be required of a simple pull down resistor, as shown in FIG. 1. When the bias switch 48 is on, the feed node is at a voltage level near the bias voltage level, and causes the PNP bipolar transistor to be in a cut off state, that it, it does not conduct. When the bias switch 48 opens, thereby disconnecting the bias voltage level from the control network 52, the diode 54 prevents charge from entering the control circuit, and the base resistor loads the PNP bipolar transistor's base, which quickly causes the PNP bipolar transistor to conduct, and thus quickly discharges the gate of the power switch through the current limiting resistor 56. In effect, the PNP bipolar transistor amplifies the current drain capability of the base resistor by a factor about equal to the beta of the PNP bipolar transistor.

In practicing the invention, it is important to arrange the windings and their associated rectifiers so that the bias voltage level rides on top of the main voltage level. That is, the bias voltage level is always higher then the main voltage level by a minimum delta, which, in the preferred embodiment, is the gate control threshold voltage of the power switch.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charger for charging a battery, comprising:
   a power supply, having a return line, for providing a main voltage level at a main voltage output, and a bias voltage level at a bias level output, the bias voltage level being higher than the main voltage level;
   an output section for filtering a switched voltage and providing a regulated current to the battery;
   a power switch, having a control terminal, coupled between the main voltage output and the output section for switching the main voltage level thereby providing the switched voltage;
   a control circuit having a bias switch for switchably connecting the control terminal of the power switch with the bias level output; and
   a control network coupled to the control terminal of the power switch.

2. A battery charger as defined by claim 1, wherein the power switch is an N channel MOSFET.

3. A battery charger as defined by claim 1, wherein the output section comprises:
   an inductor coupled in series between the battery and the power switch;
   a freewheel diode coupled between the power switch and the return line of the power supply; and
   an output filter capacitor coupled in parallel with the battery.

4. A battery charger as defined by claim 1, wherein the power supply comprises a transformer having a primary side and a secondary side, the secondary side having a main winding for providing voltage to the main voltage output, and a bias winding for providing voltage to the bias level output.

5. A battery charger as defined by claim 4, wherein said bias winding is coupled in series with said main winding.

6. A battery charger for charging a battery, comprising:
   a transformer having a secondary side having a main winding and a bias winding, the main winding providing voltage for a main voltage output, the bias winding providing voltage for a bias level output, the bias level output having a bias voltage level which is higher than a main voltage level at the main level output;
   an output section, having a series inductor and a shunt freewheel diode, for filtering a switched voltage and providing a regulated current to the battery;
   a power switch, having a control terminal, coupled between the output section and the main voltage output for providing the switched voltage to the output section; and a control circuit, having a bias switch coupled between the control terminal of the power switch and the bias voltage output.

7. A battery charger as defined by claim 6, wherein the main winding and the bias winding are coupled in series.

8. A battery charger as defined by claim 7, further comprising a bias rectifier coupled to the bias winding, and a main rectifier coupled to the main winding.

9. A battery charger as defined by claim 6, wherein the power switch is a transistor.

10. A battery charger as defined by claim 9, wherein the transistor is a N-channel MOSFET.

11. A battery charger as defined by claim 6, further comprising a control network coupled to the control terminal of the power switch.

12. A battery charger as defined by claim 11, wherein the control network is a pull down resistor.

13. A battery charger as defined by claim 11 wherein the control network comprises an emitter follower.

* * * * *